(12) United States Patent
Wood et al.

(10) Patent No.: US 12,413,525 B2
(45) Date of Patent: *Sep. 9, 2025

(54) DYNAMIC NETWORK ROUTING BASED ON APPLICATION LOAD

(71) Applicant: Cisco Technology, Inc., San Jose, CA (US)

(72) Inventors: Steven William Wood, Ottawa (CA); Ding Bai, San Jose, CA (US); Ramanathan Lakshmikanthan, Santa Clara, CA (US); Natal Alberto Rodriguez, Leon (ES); Fabio R. Maino, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,507

(22) Filed: Mar. 14, 2024

(65) Prior Publication Data

US 2024/0223464 A1 Jul. 4, 2024

Related U.S. Application Data

(63) Continuation of application No. 17/503,660, filed on Oct. 18, 2021, now Pat. No. 12,003,385.

(Continued)

(51) Int. Cl.
*H04L 47/125* (2022.01)
*H04L 47/76* (2022.01)

(52) U.S. Cl.
CPC ............ *H04L 47/125* (2013.01); *H04L 47/76* (2013.01)

(58) Field of Classification Search
None
See application file for complete search history.

(56) References Cited

U.S. PATENT DOCUMENTS 9,967,232 B1 5/2018 Royt et al.
10,791,168 B1 9/2020 Dilley et al.
(Continued)

FOREIGN PATENT DOCUMENTS

WO 2020091736 A1 5/2020

OTHER PUBLICATIONS

Chaudhry S., et al., "A Distributed SDN Application for Cross-Institution Data Access", In 2019 28th International Conference on Computer Communication and Networks (ICCCN), pp. 1-9, IEEE, 2019.

(Continued)

*Primary Examiner* — Boris D Grijalva Lobos
(74) *Attorney, Agent, or Firm* — Lee & Hayes, P.C.

(57) ABSTRACT

Techniques for dynamic routing based on application load are described herein. The techniques may include receiving load information associated with resources of an application orchestration system that are allocated to host an application, the resources associated with different geographical regions. Based at least in part on the load information, a network controller may determine that first resources of the application orchestration system are less constrained than second resources of the application orchestration system, the first resources associated with a first geographical region and the second resources associated with a second geographical region. Based at least in part on the first resources being less constrained than the second resources, application traffic may be routed through the network to the application hosted by the first resources in the first geographical region.

20 Claims, 6 Drawing Sheets

Related U.S. Application Data

(60) Provisional application No. 63/155,658, filed on Mar. 2, 2021.

(56) References Cited

U.S. PATENT DOCUMENTS

| | | | |
|---|---|---|---|
| 10,999,168 B1 | 5/2021 | Gupta et al. | |
| 11,075,984 B1 | 7/2021 | Mercier et al. | |
| 11,121,941 B1 | 9/2021 | Johnston et al. | |
| 11,157,253 B1 | 10/2021 | Shteyman et al. | |
| 11,463,510 B2 | 10/2022 | Kodavanty et al. | |
| 2005/0120095 A1 | 6/2005 | Aman et al. | |
| 2007/0208874 A1 | 9/2007 | Previdi et al. | |
| 2010/0128606 A1 | 5/2010 | Patel et al. | |
| 2014/0189074 A1 | 7/2014 | Parker | |
| 2014/0280959 A1 | 9/2014 | Bauer | |
| 2014/0365626 A1 | 12/2014 | Radhakrishnan et al. | |
| 2015/0029853 A1 | 1/2015 | Raindel et al. | |
| 2015/0052218 A1* | 2/2015 | Zhang | H04L 67/10 |
| | | | 709/217 |
| 2016/0112505 A1 | 4/2016 | Perryman et al. | |
| 2016/0164787 A1 | 6/2016 | Roach et al. | |
| 2016/0165006 A1 | 6/2016 | Fitzpatrick et al. | |
| 2016/0234099 A1 | 8/2016 | Jiao | |
| 2019/0319872 A1 | 10/2019 | Adhikari et al. | |
| 2020/0287976 A1 | 9/2020 | Theogaraj et al. | |
| 2020/0310394 A1 | 10/2020 | Wouhaybi et al. | |
| 2020/0314173 A1* | 10/2020 | Pahwa | H04L 67/02 |
| 2020/0366759 A1 | 11/2020 | Sinha | |
| 2020/0382387 A1 | 12/2020 | Pasupathy et al. | |
| 2020/0389417 A1 | 12/2020 | Wetterwald et al. | |
| 2021/0176304 A1 | 6/2021 | Muthiah et al. | |
| 2021/0297891 A1 | 9/2021 | Berzin et al. | |
| 2021/0383439 A1 | 12/2021 | Edamadaka et al. | |
| 2022/0116815 A1 | 4/2022 | Lu et al. | |
| 2022/0150303 A1 | 5/2022 | Quevedo | |
| 2022/0286517 A1 | 9/2022 | Wood et al. | |

OTHER PUBLICATIONS

Final Office Action for U.S. Appl. No. 17/503,660, dated Feb. 1, 2023, 19 Pages.

International Preliminary Report on Patentability for International Application No. PCT/US2022/016633, mailed Sep. 14, 2023, 9 Pages.

Non-Final Office Action for U.S. Appl. No. 17/503,660, dated Jun. 2, 2023, 32 Pages.

Non-Final Office Action for U.S. Appl. No. 17/503,660, dated Oct. 3, 2022, 18 Pages.

Shojaee M., et al., "Safeguard: Congestion and Memory-Aware Failure Recovery in SD-WAN", In 2020 16th International Conference on Network and Service Management (CNSM), pp. 1-7, IEEE, 2020.

Office Action for Indian Application No. 202347030413, dated Mar. 19, 2025, 8 Pages.

* cited by examiner

| APPLICATION 202 | ROUTING PREFERENCE 204 | APPLICATION HEALTH 206 | REACHABILITY 208 |
|---|---|---|---|
| APPLICATION IN FIRST GEOLOCATION 202(1) | ROUTING PREFERENCE (E.G., HIGH) 204(1) | APPLICATION HEALTH (E.G., MAX CAPACITY) 206(1) | REACHABILITY (E.G., GOOD) 208(1) |
| APPLICATION IN SECOND GEOLOCATION 202(2) | ROUTING PREFERENCE (E.G., LOW) 204(2) | APPLICATION HEALTH (E.G., 40% CAPACITY) 206(2) | REACHABILITY (E.G., GOOD) 208(2) |
| ... | ... | ... | ... |
| APPLICATION IN NTH GEOLOCATION 202(N) | ROUTING PREFERENCE (E.G., HIGH) 204(N) | APPLICATION HEALTH (E.G., 60% CAPACITY) 206(N) | REACHABILITY (E.G., GOOD) 208(N) |

FIG. 2

| APPLICATION 302 | ROUTING PREFERENCE 304 | APPLICATION HEALTH 306 | REACHABILITY 308 |
|---|---|---|---|
| APPLICATION IN FIRST GEOLOCATION 302(1) | ROUTING PREFERENCE (E.G., HIGH) 304(1) | | |
| APPLICATION IN SECOND GEOLOCATION 302(2) | ROUTING PREFERENCE (E.G., LOW) 304(2) | | |
| ... | ... | ... | ... |
| APPLICATION IN NTH GEOLOCATION 302(N) | ROUTING PREFERENCE (E.G., HIGH) 304(N) | | |

FIG. 3

DYNAMIC NETWORK ROUTING BASED ON APPLICATION LOAD

RELATED APPLICATIONS

This application claims priority to U.S. patent application Ser. No. 17/503,660, filed on Oct. 18, 2021, and U.S. Provisional Patent Application No. 63/155,658, filed on Mar. 2, 2021, the entire contents of which are incorporated herein by reference and for all purposes.

TECHNICAL FIELD

The present disclosure relates generally to various techniques for enabling networks, and in particular, software defined wide area networks, to make dynamic routing decisions based on application loads across multiple regions.

BACKGROUND

Traditionally, networks lack knowledge of the health of the applications that they provide connectivity to. In some cases, a network can try to infer application health by using different probing techniques. This can include monitoring traffic sent between clients and applications to detect if the application is experiencing load issues or sending application requests to application endpoints to measure responsiveness and response time. However, these probing techniques can limit the types of optimizations that the network can do to provide appropriate application connectivity, as well as how proactive the network can be. Thus, with limited knowledge of the application health, rather than proactively mitigating problems, the best a network can do is to react once a problem arises.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 is an example table illustrating different load information that may be used to determine which application/location that traffic should be routed to.

FIG. 3 is another example table illustrating different load information that may be used to determine which application/location that traffic should be routed to.

DESCRIPTION OF EXAMPLE EMBODIMENTS

Overview

Figure 1A:
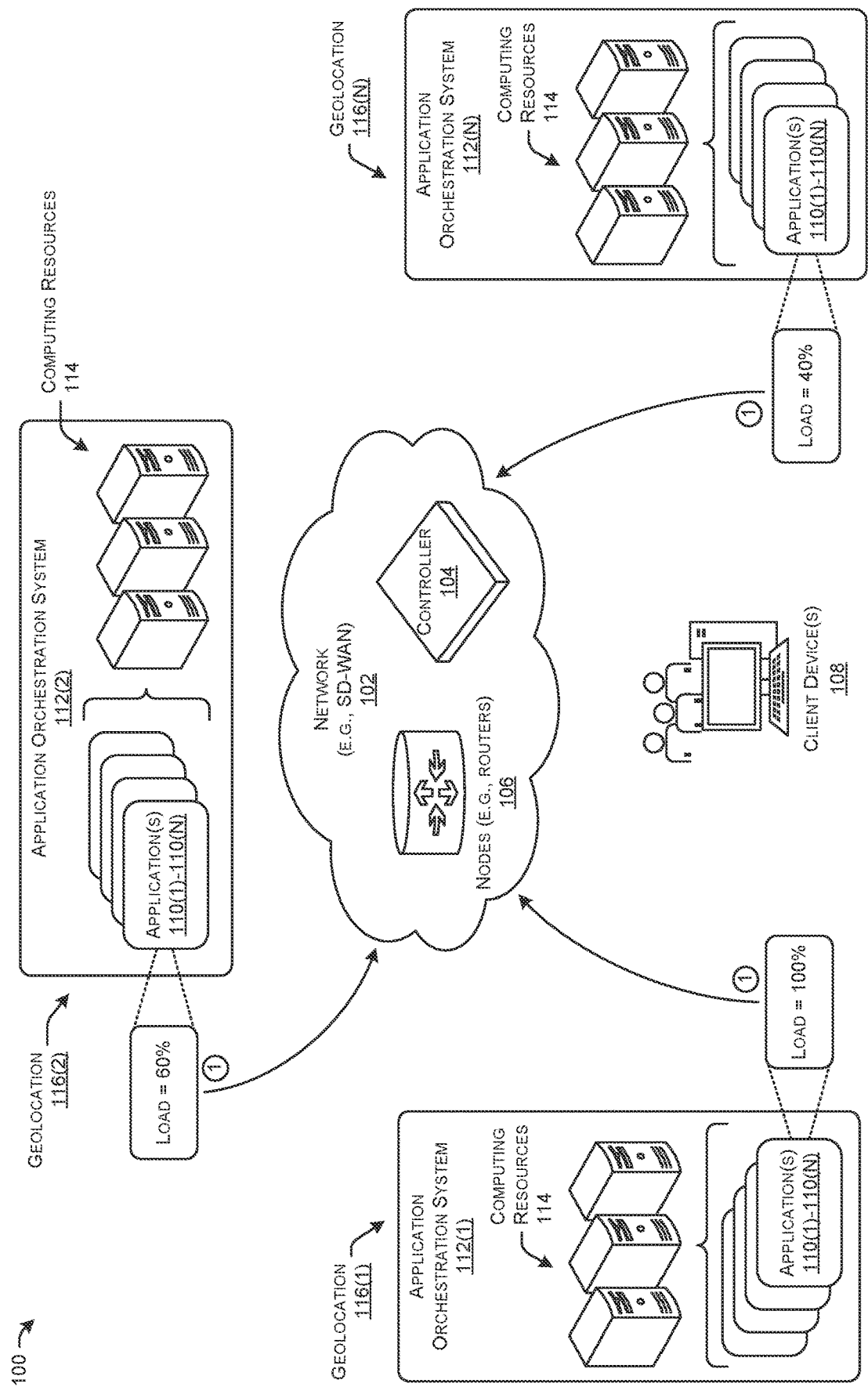
FIGS. 1A and 1B are system-architecture diagrams illustrating an example architecture and data flow associated with some of the techniques described herein for routing traffic based on application loads.

This disclosure describes various technologies associated with enabling networks to make dynamic routing decisions based on application loads across multiple regions. By way of example, and not limitation, a method according to the various technologies presented herein may include receiving, at a controller of a network, a request to route traffic through the network, the traffic associated with an application. Additionally, the method may include receiving, at the controller, load information associated with resources of an application orchestration system that are allocated to host the application. The load information may include first load information associated with first resources of the application orchestration system allocated to host the application, the first resources located in a first geographical region. Additionally, the load information may also include second load information associated with second resources of the application orchestration system allocated to host the application, the second resources located in a second geographical region different than the first geographical region. The method may also include determining, by the controller and based at least in part on the load information, that the first resources are less constrained than the second resources. Based at least in part on the first resources being less constrained than the second resources, the controller may cause the traffic to be routed through the network to the application hosted by the first resources in the first geographical region.

Additionally, the techniques described herein may be performed as a method and/or by a system having non-transitory computer-readable media storing computer-executable instructions that, when executed by one or more processors, performs the techniques described above.

EXAMPLE EMBODIMENTS

As discussed above, networks traditionally lack knowledge of the health of the applications that they provide connectivity to. In some cases, a network can try to infer application health by using different probing techniques. This can include monitoring traffic sent between clients and applications to detect if the application is experiencing load issues or sending application requests to application endpoints to measure responsiveness and response time. However, these probing techniques can limit the types of optimizations that the network can do to provide appropriate application connectivity, as well as how proactive the network can be. Thus, with limited knowledge of the application health, rather than proactively mitigating problems, the best a network can do is to react once a problem arises.

Accordingly, this disclosure describes techniques for integrating a network (e.g., SD-WAN) with an application orchestration system (e.g., a cloud native, scalable application service platform) to make automatic decisions regarding re-directing traffic based on application load. As opposed to existing solutions, these techniques allow the network to have first-hand information about the application health provided by the application infrastructure, and the network may use this information to derive routing policies. This deviates from traditional routing algorithms in networks that base forwarding on reachability information and network performance.

In some examples, application health may be exchanged with a controller of the network (e.g., an SD-WAN controller/orchestrator) via a shared application programming interface (API), through an external component (e.g., a service registry, a key-value database, etc.), or even via signaling on the data plane packets. In some examples, the controller may retrieve this information proactively, for instance, by querying the application orchestration system periodically. Additionally, or alternatively, the controller may be notified when there is an update in the application load information. For instance, the controller may be notified by a subscription service where the controller subscribes to certain applications and gets notifications when the loads of those applications change.

In some examples, the load information may be composed of multiple pieces of information. For instance, the load information may include a current infrastructure utilization of application components, which may be in terms of CPU or memory usage. Additionally, or alternatively, the load information may include a number of replicas for a given application or how many backend components are sustaining the current operation of the application.

In some instances, to use the application load information for dynamic routing decisions, the same application may need to be available in different geographic regions. In this way, the network controller may select which of the regions is more suitable to receive the traffic that is being routed through the network. In examples, the application load information may be tied with the geographic regions where the application is present.

In some examples, to use the load of the application for dynamic routing decisions, the network controller and the application orchestration system may agree on how the load is to be represented. For instance, one option may include the application orchestration system exposing the application load in a particular region as a percentage of the total supported application load in that region. Additionally, or alternatively, another option may be to represent the load as different tiers (e.g., green, yellow, red, etc.) and pass that information to the network controller.

According to the techniques disclosed herein, improvements in computer-related technology may be realized. For instance, by dynamically allocating traffic to applications based on current loads of those applications, the possibility of overloading resources and/or causing an error may be decreased. Additionally, the techniques allow for a network to have first-hand information about application health provided by the application infrastructure, and the network may use this information to derive routing policies. Furthermore, by allocating traffic to applications based on current loads of those applications, computing resources are used more effectively and efficiently by decreasing the amount of unused computing resources.

By way of example and not limitation, a method according to the techniques disclosed herein may include receiving a request to route, through a network, traffic that is associated with an application. In some examples, the network may be a software-defined wide area network (SD-WAN) that provides clients connectivity to the application. In at least one example, the request is received at a controller of the network (e.g., an SD-WAN controller/orchestrator), a router of the network, a logical node of the network, and/or the like.

In some examples, the method may include receiving load information associated with resources of an application orchestration system (e.g., a scalable application service platform, such as Kubernetes, Amazon ECS, Docker Swarm, Apache Messos, and the like). The resources may be allocated to host the application. For instance, the load information may be received by the controller, the router, and/or the logical node described above. In some examples, the load information may include first load information associated with first resources of the application orchestration system allocated to host the application (e.g., a first instance of the application). The first resources may be located in, or otherwise associated with, a first geographical region, geo- location, etc. (e.g., U.S. West coast). Additionally, the load information may include second load information associated with second resources of the application orchestration system allocated to host the application (e.g., a second instance of the application). The second resources may be located in, or otherwise associated with, a second geographical region, geolocation, etc. (e.g., U.S. East coast).

In various examples, the load information associated with the resources may be indicative of a utilization of the resources that are allocated to host the application and/or other applications at each geographical region. The resources may include processing units and/or memory. Additionally, or alternatively, the load information may be indicative of a number of replicas of the application or other applications instantiated at each geographical region. In some examples, the load information may be indicative of a current load of the resources or a predicted, future load of the resources.

In some examples, the load information may be received (e.g., by the controller), and from the application orchestration system, via an application programming interface (API), a service registry, a data base (e.g., a key-value database). Additionally, or alternatively, the load information may be received via telemetry data carried within the application traffic. In some examples, the load information may be received based at least in part on an expiration of a period of time, the load information being updated, and the like.

In some examples, the method may include determining, based at least in part on the load information, that the first resources are less constrained than the second resources. For instance, the controller, router, logical node, etc. may determine that the first resources have more available processing units (e.g., CPUs, GPUs, etc.) than the second resources, that the first resources have more memory available than the second resources, and/or that the second resources have more replicas of the application instantiated than the first resources. Additionally, or alternatively, the controller, router, logical node, etc. may determine that the first resources are likely to be less constrained than the second resources based on historic utilization data and demand patterns.

In some examples, reachability scores may be determined for each of the different resources. A reachability score may represent which resources are associated with a shortest routing path. For instance, a first reachability score may be determined that is associated with routing the traffic to the application hosted by the first resources located in the first geographical region. Additionally, a second reachability score may be determined that is associated with routing the traffic to the application hosted by the second resources located in the second geographical region. In various examples, the controller, the router, the logical node, etc. may determine the reachability scores for all of the resources running the application.

In various examples, the traffic may be routed through the network to the application hosted by the first resources located in, or otherwise associated with, the first geographical region. For instance, the traffic may be routed to the application hosted by the first resources based at least in part on the first resources being less constrained than the second resources. Additionally, in some examples, the traffic may be routed through the network to the application hosted by the first resources based at least in part on a first reachability score associated with the first resources being better than, or the same as, a second reachability score associated with the second resources.

In at least one example, a first portion of the traffic may be routed through the network to the application hosted by the first resources and a second portion of the traffic may be routed through the network to the application hosted by the second resources. In some examples, the first portion of the traffic and the second portion of the traffic may be proportional to an available amount of the first and second resources. For instance, if the first resources/application are operating at 40% capacity and the second resources/application are operating at 60% capacity, then 60% of new traffic requests may be routed to the first resources/application and 40% of the new traffic requests may be routed to the second resources/application.

In some examples, the traffic may be routed based on a "load-first routing" scheme. In this mode of operation, the load balancing priorities may be established first by application health, and then by other policy/telemetry/metadata attributes available to the network. This means that, when possible, the traffic for a particular application available at multiple locations may be routed towards the location with the best load.

In some examples, the traffic may be routed based on a "load-priority routing" scheme. In this mode of operation, the load of the application may be used in combination with other routing parameters, potentially being used to break ties as part of a routing decision (e.g., an SD-WAN routing decision).

In some examples, the traffic may be routed based on a "load-proportional routing" scheme. In this mode of operation, the traffic may be dynamically balanced across the different application locations according to the current load in each location.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
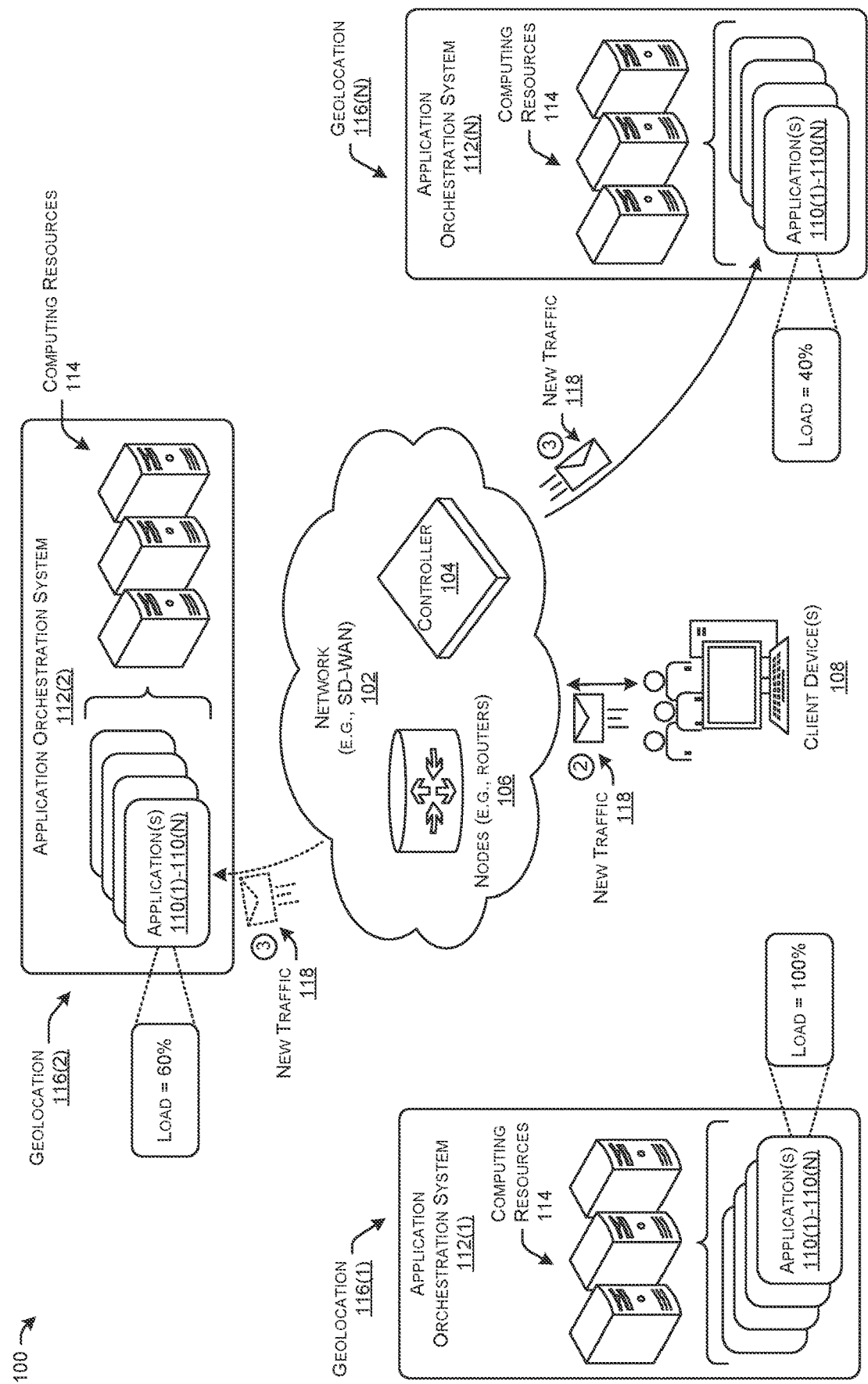

FIGS. 1A and 1B are system-architecture diagrams illustrating an example architecture 100 and data flow associated with some of the techniques described herein for routing traffic based on application loads. The architecture 100 may include a network 102 having a network controller 104 and one or more nodes 106 that route traffic through the network 102. For instance, the nodes 106 may route the traffic between one or more client device(s) 108 and one or more applications 110(1)-110(N) (herein after referred to collectively as "applications 110") (where N represents any number greater than or equal to one) of different application orchestration systems 112(1), 112(2), and 112(N) (herein after referred to collectively as "application orchestration systems 112") (where N represents any number greater than or equal to one). In various examples, the same applications 110 (or different instances of a same application) may be running at the different application orchestration systems 112, and the nodes 106 of the network 102 may cause traffic to be routed to the application 110 with the smallest load.

The network 102 may be a software defined wide area network (SD-WAN) and the controller 104 may be an SD-WAN controller/orchestrator. The nodes 106 may be logical nodes and/or any physical device capable of forwarding packets. For instance, the nodes 106 may be routers, switches, general purpose computers, software nodes, gateways, and/or any other networking device capable of forwarding packets through the network 102. The network 102 may facilitate the communication of traffic between the client devices 108 and the applications 110 of the application orchestration systems 112. In some examples, the network 102 may include an overlay network and an underlay network. The overlay network may comprise a telecommunications network that is built on top of the underlay network and is supported by its infrastructure (e.g., the underlay network's physical devices, such as the nodes 106). The underlay network may comprise a software-defined/API-driven underlay provider (e.g., PacketFabric, Megaport, PCCW Global's ConsoleConnect, etc.). It should be appreciated that, although shown as residing in the same network 102 for simplicity, the controller 104 may reside in a different network than the nodes 106. In some instances, the controller 104 may additionally, or alternatively, reside in a different geographic location than the nodes 106.

The application orchestration systems 112 may host one or more third-party applications, virtual machines, containers, and the like using infrastructure (e.g., physical devices, such as the computing resources 114) of the application orchestration systems 112. For instance, the application orchestration systems 112 may be cloud native, scalable application service platforms (e.g., container-orchestration systems such as Kubernetes, Amazon ECS, Docker Swarm, Apache Messos, and the like). The computing resources 114 of the application orchestration systems 112 may be used to host the applications 110. The computing resources 114 may comprise hardware servers, software servers that are running on computer hardware, processors, general purpose computers, and the like. In some examples, the application orchestration systems 112 (or the computing resources 114) may be located in, or otherwise associated with, different geographical regions or geolocations, such as a first geolocation 116(1), a second geolocation 116(2), and an Nth geolocation 116(N) (hereinafter referred to collectively as "geolocations 116") (where N represents any number greater than or equal to one). In some examples, a single application orchestration system 112 may be associated with two or more different geolocations 116. In some examples, the computing resources 114 and/or the applications 110 may be distributed between different data centers associated with the application orchestration systems 112, different networks associated with the application orchestration systems 112, different zones of a cloud service provider, and the like.

With respect to FIG. 1A, at "1" the network 102 (e.g., the controller 104 or the nodes 106) may receive load information associated with the application orchestration systems 112 and/or load information associated with specific applications 110 hosted by the application orchestration systems 112. In some examples, the load information may be received from the application orchestration systems 112 via an application programming interface (API), a service registry, a data base (e.g., a key-value database), and/or the like. Additionally, or alternatively, the load information may be received via telemetry data carried within traffic. In some examples, the load information may be indicative of available or unavailable processing units (e.g., CPUs, GPUs, etc.) and/or memory associated with the applications 110, the application orchestration systems 112, and/or the computing resources 114. Additionally, or alternatively, the load information may be indicative of a number of replicas of each of the applications currently instantiated at each application orchestration system 112 geolocation 116.

In various examples, the load information may be used to determine load capacities of specific applications 110 and/or load capacities of the computing resources 114 hosting the specific applications 110. For instance, load information received from the application orchestration system 112(1) may be used to determine that an application 110 hosted by the application orchestration system 112(1) and/or the computing resources 114 of the application orchestration system 112(1) is/are operating at 100% capacity. Additionally, load information received from the application orchestration system 112(2) may be used to determine that an application 110 hosted by the application orchestration system 112(2) and/or the computing resources 114 of the application orchestration system 112(2) is/are operating at 60% capacity. And further, load information received from the application orchestration system 112(N) may be used to determine that an application 110 hosted by the application orchestration system 112(N) and/or the computing resources 114 of the application orchestration system 112(N) is/are operating at 40% capacity, and so forth.

With respect to FIG. 1B, at "2" the network 102 may receive new traffic 118 from the client device(s) 108 that is to be sent to one of the applications 110. For instance, one of the nodes 106 of the network 102 may receive the new traffic 118. Based at least in part on the load information received from the application orchestration systems 112 and/or the specific applications 110 hosted by the application orchestration systems 112, at "3" the network 102 may direct the new traffic 118 to the application 110 hosted by the application orchestration system 112(N) at the geolocation 116(N). For instance, the network 102 may direct the new traffic 118 to the application 110 hosted by the application orchestration system 112(N) at the geolocation 116(N) based at least in part on the load information indicating that the application 110 and/or the resources 114 hosting the application is/are operating at 40% capacity.

In some examples, if the network 102 is routing traffic according to the "load-proportional routing" scheme, the network 102 may direct a first portion of the new traffic 118 to the application 110 hosted by the application orchestration system 112(N) at the geolocation 116(N), and the network 102 may direct a second portion of the new traffic 118 to the application 110 hosted by the application orchestration system 112(2) at the geolocation 116(2). For instance, the network 102 may direct 60% of the new traffic 118 to the application 110 hosted by the application orchestration system 112(N) at the geolocation 116(N), and the network 102 may direct 40% of the new traffic 118 to the application 110 hosted by the application orchestration system 112(2) at the geolocation 116(2).

FIG. 2 is an example table 200 illustrating different load information that may be used to determine which application/location that traffic should be routed to. The table may include information associated with an application 202 that may be used to determine where to send traffic at different instances of time. For instance, the information associated with the application 202 may include a routing preference 204, application health 206, and reachability 208.

As shown in the table 200, the application in the first geolocation 202(1) includes a "high" routing preference 204(1), is operating at "max capacity" 206(1), and has a "good" reachability score 208(1). The application in the second geolocation 202(2) includes a "low" routing preference 204(2), is operating at "40% capacity" 206(2), and has a "good" reachability score 208(2). The application in the Nth geolocation 202(N) includes a "high" routing preference 204(N), is operating at "60% capacity" 206(N), and has a "good" reachability score 208(N).

In some examples, the traffic may be routed based on a "load-first routing" scheme. In this mode of operation, the load balancing priorities may be established first by application health 206, and then by other policy/telemetry/metadata attributes available to the network, such as routing preference 204 and/or reachability 208. This means that, when possible, the traffic for a particular application available at multiple locations may be routed towards the location with the best load. For instance, in the table 200, the application in the second geolocation 202(2) will receive all the traffic routed through the network for that application 202 since the application in the second geolocation 202(2) has the best application health 206(2) (40% capacity).

In some examples, the traffic may be routed based on a "load-priority routing" scheme. In this mode of operation, the load of the application may be used in combination with other routing parameters, potentially being used to break ties as part of a routing decision (e.g., an SD-WAN routing decision). For instance, in the table 200 the application in the first geolocation 202(1) and the application in the Nth geolocation 202(N) are equivalent in terms of reachability 208 (e.g., shortest path routing), and thus the application health 206 (e.g., load) of the application 202 in those two locations may be used to break the tie. In the case shown in table 200, the application health will break the tie in favor of the application in the Nth geolocation 202(N) since its application health 206(N) is better than the application health 206(1) of the application in the first geolocation 202(1) (e.g., 60% capacity versus max capacity).

In some examples, traffic may be routed based on a "load-proportional routing" scheme. In this mode of operation, the traffic may be dynamically balanced across the different application locations according to the current application health 206 in each location. That means that if, in the table 200, the load is 100% for the application in the first geolocation 202(1), 40% for the application in the second geolocation 202(2), and 60% for the application in the Nth geolocation 202(N), the network will use this information to send 0% of the traffic to the application in the first geolocation 202(1), send 60% of the traffic to the application in the second geolocation 202(2), and send 40% of the traffic to the application in the Nth geolocation 202(N).

FIG. 3 is another example table 300 illustrating different load information that may be used to determine which application/location that traffic should be routed to. The example table 300 is similar to the example table 200 illustrated in FIG. 2, except that in table 300 the application health 306 and the reachability 308 for each of the applications 302 is represented with a different pattern to indicate the application health 306 and the reachability 308.

As shown in the table 300, the application in the first geolocation 302(1) includes a "high" routing preference 304(1), application health 306 is operating at or near maximum capacity (indicated by a dark pattern fill), and has a good reachability score 308 (indicated by a light pattern fill). The application in the second geolocation 302(2) includes a "low" routing preference 304(2), application health 306 is operating at or near a low load capacity (indicated by the light pattern fill), and has a good reachability score 308. The application in the Nth geolocation 302(N) includes a "high" routing preference 304(N), application health 306 is operating at or near an intermediate load capacity (indicated by the medium pattern fill), and has a good reachability score 308.

In some examples, the different patterns used to indicate the application health 306 and the reachability 308 for the respective applications 302 may additionally or alternatively, be represented by different colors, patterns, or other visual indicators. For instance, the application health 306 of the application in the first geolocation 302(1) may be represented by a red color to indicate that the application health 306 is at or near maximum capacity (e.g., greater than a threshold capacity). Additionally, the application health 306 of the application in the second geolocation 302(2) may be represented by a green color to indicate that the application health 306 is at or near a good operating capacity (e.g., less than a threshold operating capacity). Further, the application health 306 of the application in the Nth geolocation 302(N) may be represented by a yellow color to indicate that the application health 306 is at or near an intermediate operating capacity.

In some examples, the traffic may be routed based on the "load-first routing" scheme. In this mode of operation, the load balancing priorities may be established first by application health 306, and then by other policy/telemetry/metadata attributes available to the network, such as routing preference 304 and/or reachability 308. This means that, when possible, the traffic for a particular application available at multiple locations may be routed towards the location with the best load. For instance, in the table 300, the application in the second geolocation 302(2) will receive all the traffic routed through the network for that application 302 since the application in the second geolocation 302(2) has the best application health 306 (e.g., green color indicating a good capacity).

In some examples, the traffic may be routed based on the "load-priority routing" scheme. In this mode of operation, the load of the application may be used in combination with other routing parameters, potentially being used to break ties as part of a routing decision (e.g., an SD-WAN routing decision). For instance, in the table 300 the application in the first geolocation 302(1) and the application in the Nth geolocation 302(N) are equivalent in terms of reachability 308 (e.g., shortest path routing), and thus the application health 306 (e.g., load) of the application 302 in those two locations may be used to break the tie. In the case shown in table 300, the application health will break the tie in favor of the application in the Nth geolocation 302(N) since its application health 306 is better than the application health 306 of the application in the first geolocation 302(1) (e.g., yellow color indicating intermediate operating capacity versus red color indicating at or near maximum operating capacity).

In some examples, traffic may be routed based on the "load-proportional routing" scheme. In this mode of operation, the traffic may be dynamically balanced across the different application locations according to the current application health 306 in each location. That means that if, in the table 300, the load is 100% for the application in the first geolocation 302(1), 40% for the application in the second geolocation 302(2), and 60% for the application in the Nth geolocation 302(N), the network will use this information to send 0% of the traffic to the application in the first geolocation 302(1), send 60% of the traffic to the application in the second geolocation 302(2), and send 40% of the traffic to the application in the Nth geolocation 302(N).

Figure 4:
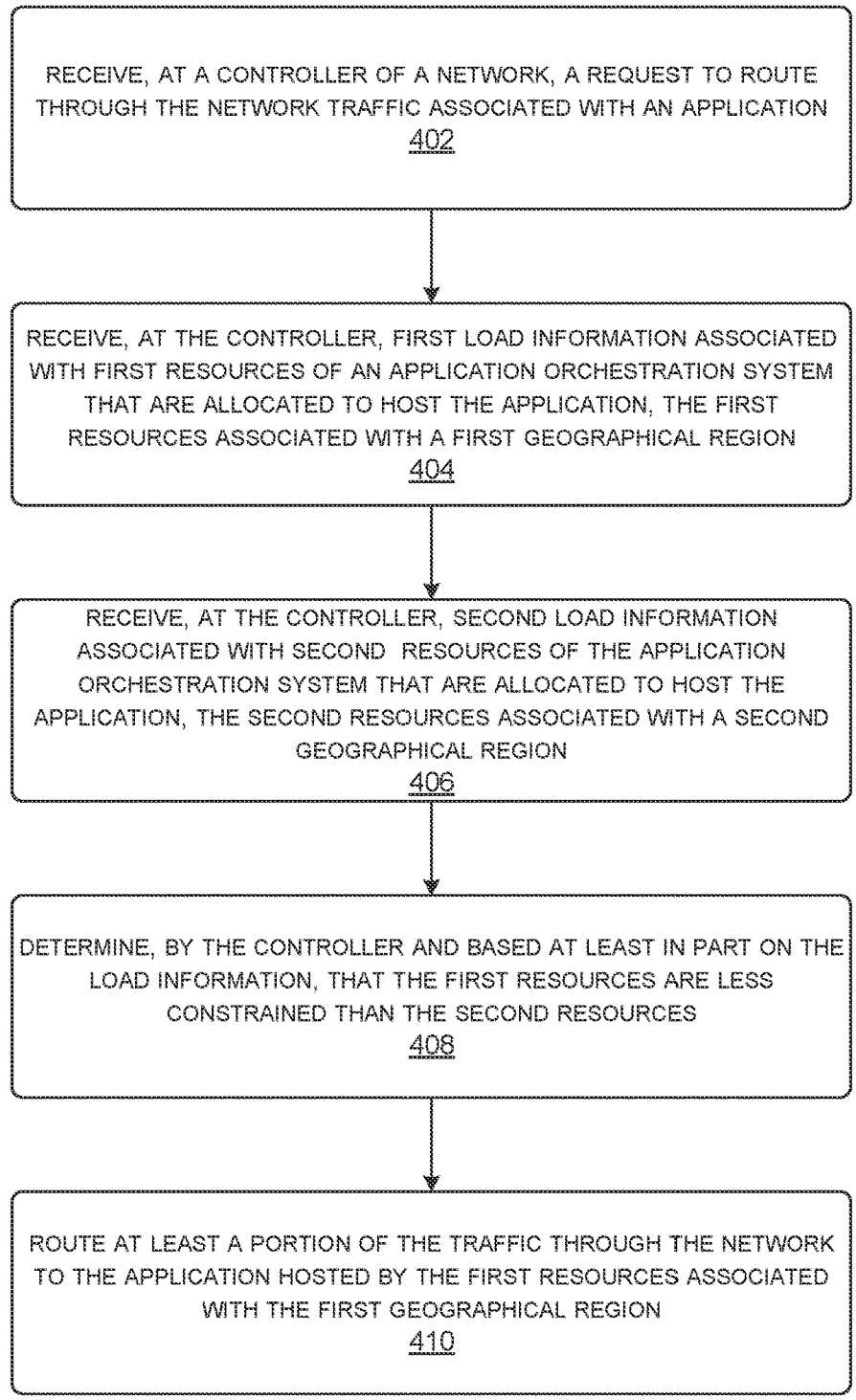
FIG. 4 is a flow diagram illustrating an example method for performing load-based routing of application traffic.

FIG. 4 is a flow diagram illustrating an example method 400 for performing load-based routing of application traffic. The logical operations described herein with respect to FIG. 4 maybe implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 400 begins at operation 402, which includes receiving, at a controller of a network, a request to route through the network traffic associated with an application. For instance, the controller 104 of the network 102 may receive a request from the one or more client device(s) 108 to route the new traffic 118 through the network 102 and to one of the applications 110 hosted by the computing resources 114 of the application orchestration systems 112.

At operation 404, the method 400 includes receiving, at the controller, first load information associated with first resources of an application orchestration system that are allocated to host the application, the first resources associated with a first geographical region. For instance, the controller 104 of the network 102 may receive the first load information associated with the first computing resources 114 of the application orchestration system 112(N) that are associated with the first geolocation 116(N).

At operation 406, the method 400 includes receiving, at the controller, second load information associated with second resources of the application orchestration system that are allocated to host the application, the second resources associated with a second geographical region. For instance, the controller 104 of the network 102 may receive the second load information associated with the second computing resources 114 of the application orchestration system 112(2) that are associated with the second geolocation 116(2).

At operation 408, the method 400 includes determining, by the controller and based at least in part on the load information, that the first resources are less constrained than the second resources. For instance, the controller may determine that the first computing resources 114 of the application orchestration system 112(N) associated with the first geolocation 116(N) are less constrained than the second computing resources 114 of the application orchestration system 112(2) associated with the second geolocation 116(2) (e.g., 40% application load capacity versus 60% application load capacity).

At operation 410, the method 400 includes routing at least a portion of the traffic through the network to the application hosted by the first resources associated with the first geographical region. For instance, the nodes 106 of the network 102 may route a first portion of the new traffic 118 through the network 102 to the application 110 hosted by the first computing resources 114 of the application orchestration system 112(N) associated with the first geolocation 112(N). Additionally, in some examples, the nodes 106 of the network 102 may route a second portion of the new traffic 118 through the network 102 to the application 110 hosted by the second computing resources 114 of the application orchestration system 112(2) associated with the second geolocation 112(2). In various examples, the first portion may be greater than the second portion in proportion to the application loads of each of the applications 110 hosted by the application orchestration systems 112.

Figure 5:
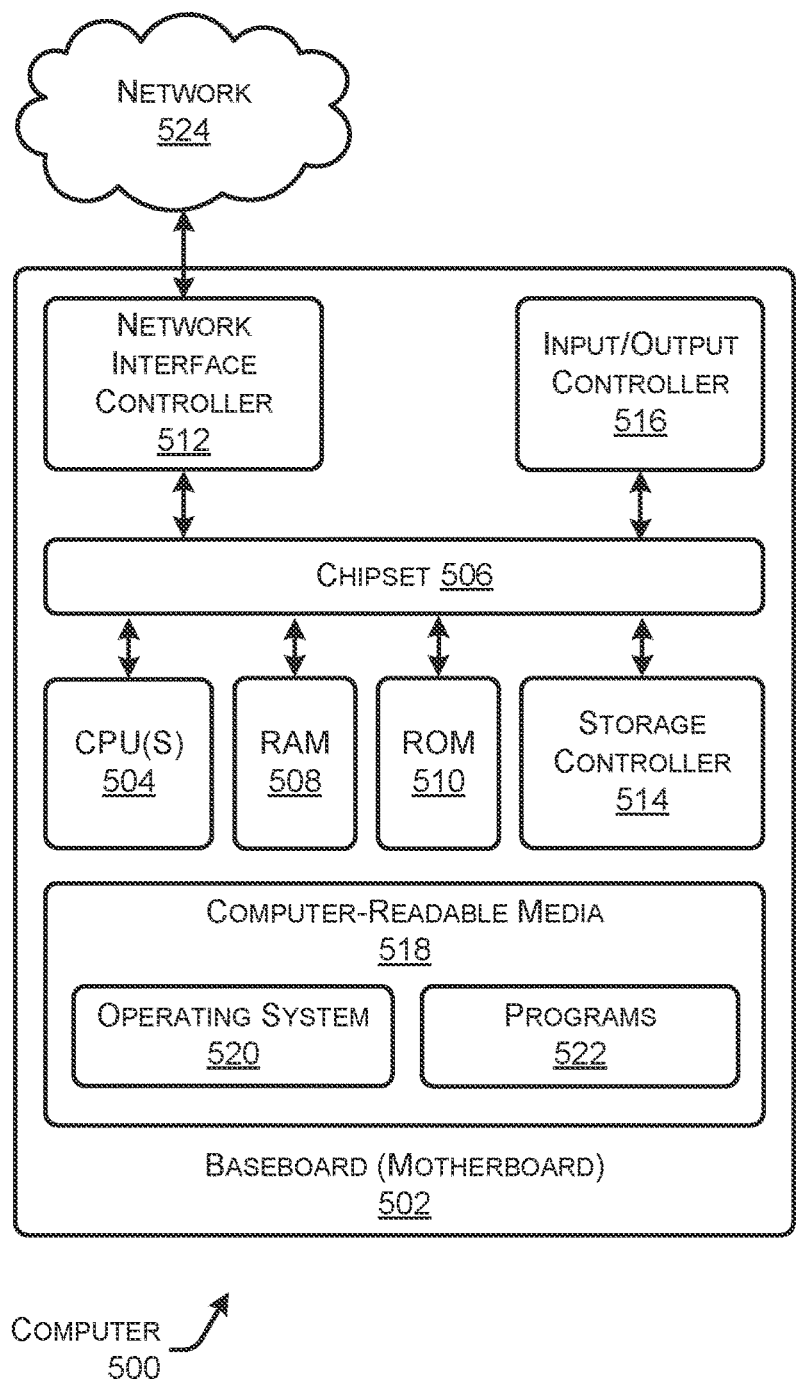
FIG. 5 is a computer architecture diagram showing an illustrative computer hardware architecture for implementing a computing device that can be utilized to implement aspects of the various technologies presented herein.

FIG. 5 is a computer architecture diagram showing an illustrative computer hardware architecture for implementing a computing device that can be utilized to implement aspects of the various technologies presented herein. The computer architecture shown in FIG. 5 illustrates a conventional server computer, controller 104, computing resource 114, node 106, router, workstation, desktop computer, laptop, tablet, network appliance, e-reader, smartphone, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 102. The chipset 506 can include functionality for providing network connectivity through a NIC 512, such as a gigabit Ethernet adapter. The NIC 512 is capable of connecting the computer 500 to other computing devices over the network 524 and/or network 102. It should be appreciated that multiple NICs 512 can be present in the computer 500, connecting the computer to other types of networks and remote computer systems. In some examples, the NIC 512 may be configured to perform at least some of the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the network 102 and or any components included therein, may be supported by one or more devices similar to computer 500. Stated otherwise, some or all of the operations performed by the network 102, and or any components included therein, may be performed by one or more computer devices 500 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington.

According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1A-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for obtaining application network metadata form a service registry to derive network policies. The programs 522 may enable the controller 104, the nodes 106, and the application orchestration systems 112 to perform various operations.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, from a device and at a controller of a network, a request to route traffic through the network between the device and an application;
   receiving, at the controller, load information associated with different instances of the application hosted in different geographical locations, the load information including at least:
      first load information associated with a first instance of the application hosted in a first geographical location, the first geographical location including first scalable resources for hosting the first instance of the application; and
      second load information associated with a second instance of the application hosted in a second geographical location, the second geographical location including second scalable resources for hosting the second instance of the application;
   determining, by the controller and based at least in part on the load information, that the first instance of the application is less constrained than the second instance of the application; and
   based at least in part on the first instance of the application being less constrained than the second instance of the application, causing, by the controller, one or more network nodes of the network to forward the traffic through the network to the first instance of the application hosted in the first geographical location.

2. The method of claim 1, wherein the load information is indicative of a utilization of scalable resources at the different geographical locations that are allocated to host the application, the scalable resources including processing units or memory.

3. The method of claim 1, wherein the load information is indicative of a number of replicas of the application instantiated at the different geographical locations.

4. The method of claim 1, wherein the load information is received by the controller via one of an application programming interface (API), a service registry, a data base, or telemetry data carried within the traffic.

5. The method of claim 1, wherein the load information is received by the controller based at least in part on an expiration of a period of time or the load information being updated.

6. The method of claim 1, wherein the first geographical location is associated with a first cloud-service provider and the second geographical location is associated with a second cloud-service provider that is different than the first cloud-service provider.

7. The method of claim 1, wherein:
   the first instance of the application is hosted on a first node associated with a container orchestration system that is running in the first geographical location, and
   the second instance of the application is hosted on a second node associated with the container orchestration system that is running in the second geographical location.

8. The method of claim 1, wherein the load information includes at least one of a routing preference, an application health, or a reachability associated with the different instances of the application.

9. The method of claim 1, further comprising:
  determining, by the controller, a first reachability score associated with routing the traffic to the first instance of the application; and
  determining, by the controller, a second reachability score associated with routing the traffic to the second instance of the application;
  wherein causing the traffic to be sent to the first instance of the application is further based at least in part on the first reachability score and the second reachability score.

10. The method of claim 1, wherein causing the one or more network nodes of the network to forward the traffic through the network to the first instance of the application hosted in the first geographical location is further based at least in part on a first routing preference associated with the first geographical location and a second routing preference associated with the second geographical location.

11. A system associated with a controller of a network, the system comprising:
  one or more processors; and
  one or more non-transitory computer-readable media storing instructions that, when executed, cause the one or more processors to perform operations comprising:
    receiving, from a device, a request to route traffic associated with an application through the network, the network disposed between the device and different geographical locations in which different instances of the application are running;
    receiving load information associated with the different instances of the application in the different geographical locations, the load information including at least:
      first load information associated with a first instance of the application hosted on first scalable resources of a first geographical location; and
      second load information associated with a second instance of the application hosted on second scalable resources of a second geographical location;
    determining, based at least in part on the load information, that the first instance of the application is less constrained than the second instance of the application; and
    based at least in part on the first instance of the application being less constrained than the second instance of the application, causing one or more network nodes of the network to steer the traffic through the network to the first instance of the application hosted in the first geographical location.

12. The system of claim 11, wherein the network is a software defined wide area network (SD-WAN) and the controller is an SD-WAN controller.

13. The system of claim 11, wherein the load information is indicative of at least one of a number of replicas of the application instantiated in the different geographical locations or a utilization of scalable resources of the different geographical locations allocated to host the different instances of the application, the scalable resources including processing units or memory.

14. The system of claim 11, wherein the load information is received based at least in part on an expiration of a period of time or the load information being updated.

15. The system of claim 11, the operations further comprising:
  determining a first reachability score associated with routing the traffic to the first instance of the application; and
  determining, by the controller, a second reachability score associated with routing the traffic to the second instance of the application;
  wherein causing the traffic to be sent to the first instance of the application is further based at least in part on the first reachability score and the second reachability score.

16. They system of claim 11, wherein:
  the first instance of the application is hosted on a first node associated with a container orchestration system that is running in the first geographical location, and
  the second instance of the application is hosted on a second node associated with the container orchestration system that is running in the second geographical location.

17. One or more non-transitory computer-readable media storing instructions that, when executed by one or more processors, cause the one or more processors to perform operations comprising:
  receiving, from a device and at a controller of a network, a request to route traffic through the network between the device and an application;
  receiving, at the controller, load information metrics associated with different instances of the application hosted in different geographical locations, the load information metrics including at least:
    a first load information metric associated with a first instance of the application hosted in a first geographical location, the first load information metric calculated based at least in part on a first number of replicas of the application in the first geographical location and a first infrastructure utilization of the first geographical location; and
    a second load information metric associated with a second instance of the application hosted in a second geographical location, the second load information metric calculated based at least in part on a second number of replicas of the application in the second geographical location and a second infrastructure utilization of the second geographical location;
  determining, at the controller and based at least in part on the load information metrics, that the first instance of the application is less constrained than the second instance of the application; and
  based at least in part on the first instance of the application being less constrained than the second instance of the application, causing, by the controller, the traffic to be sent through the network to the first instance of the application hosted in the first geographical location.

18. The one or more non-transitory computer-readable media of claim 17, wherein the network is a software defined wide area network (SD-WAN) and the controller is an SD-WAN controller.

19. The one or more non-transitory computer-readable media of claim 17, the operations further comprising:
  determining, by the controller, a first reachability score associated with routing the traffic to the first instance of the application; and
  determining, by the controller, a second reachability score associated with routing the traffic to the second instance of the application;
  wherein causing the traffic to be sent to the first instance of the application is further based at least in part on the first reachability score and the second reachability score.

20. The one or more non-transitory computer-readable media of claim 17, wherein the load information metrics are calculated further based at least in part on routing preference scores associated with the different geographical locations.

\* \* \* \* \*